United States Patent [19]

Sartori

[11] E Patent Number: Re. 33,431

[45] Reissued Date of Patent: Nov. 13, 1990

[54] BROOM OR BRUSH WITH HINGED HANDLE

[75] Inventor: Francesco Sartori, Via San Felice, 44, 40122, Bologna, Italy

[73] Assignee: Francesco Sartori, Bologna, Italy

[21] Appl. No.: 384,270

[22] Filed: Jul. 20, 1989

Related U.S. Patent Documents

Reissue of:

[64] Patent No.: 4,796,324
Issued: Jan. 10, 1989
Appl. No.: 101,371
Filed: Sep. 25, 1987

[30] Foreign Application Priority Data

Sep. 26, 1986 [IT] Italy ..... 3525 A/86

[51] Int. Cl.[5] ..... B25G 3/38; A46B 15/00

[52] U.S. Cl. ..... 15/144 R; 15/172; 403/113

[58] Field of Search ..... 15/144 R, 144 A, 172; 403/160, 113, 117; 16/374

[56] References Cited

U.S. PATENT DOCUMENTS

| | | | |
|---|---|---|---|
| 366,790 | 7/1887 | Orther | 14/144 R |
| 482,221 | 9/1892 | Barnett et al. | 15/144 R |
| 562,362 | 6/1896 | Koetzner | 15/144 R |
| 1,186,915 | 6/1916 | Landis | 15/144 R |
| 1,389,743 | 9/1921 | Croner | 15/144 R |
| 2,013,963 | 9/1935 | Ingling | 15/144 R |
| 2,532,979 | 12/1950 | Wilson | 15/144 R |
| 4,455,705 | 6/1984 | Graham | 15/144 R |
| 4,658,461 | 4/1987 | Roe et al. | 15/144 R |

*Primary Examiner*—Edward L. Roberts
*Attorney, Agent, or Firm*—Laff, Whitesel, Conte & Saret

[57] ABSTRACT

The handle of the broom is canted in relation to its axis of rotation about the broomhead back through a given angle, and connected to the back by way of a hinge the axis of which is inclined through an angle, relative to the longitudinal axis of the back itself. The broom can be used with the handle either upright, or folded down in such a way as to keep the broomhead with the bristles resting upon the surface to be cleaned, without any unwanted tilting or wobbling movement.

5 Claims, 2 Drawing Sheets

BROOM OR BRUSH WITH HINGED HANDLE

Matter enclosed in heavy brackets [ ] appears in the original patent but forms no part of this reissue specification; matter printed in italics indicates the additions made by reissue.

BACKGROUND OF THE INVENTION

The invention relates to a broom, or brush particular for sweeping floors, the handle of which is hinged in relation to the back of the broomhead, or the body of the brush.

Conventional brooms have the handle set in a fixed position relative to the back in which the bristles are planted, albeit angled differently according to the ultimate use for which they are designed. It is practically impossible, however, to make use of such implements for sweeping beneath furniture etc., as the extremely narrow angle that must be assumed renders the bristles unable to gather up and remove dust and dirt.

The prior art embraces brushes, intended for other uses (e.g. cleaning motor vehicles, windows etc.), the handles of which are rotatable about an axis coinciding with the longitudinal axis of the back; such designs are unsuitable in practice for domestic use, as the body of the brush is prevented from following the movement of the handle rigidly, and instead, swivels uncontrollably about the longitudinal axis of rotation.

Accordingly, the object of the invention is to overcome the drawbacks aforementioned.

SUMMARY OF THE INVENTION

The stated object is achieved with a broom or brush as disclosed and claimed herein, with which it becomes possible both to sweep in the usual manner (with the handle upright), and to clean spaces in which the handle needs to lie parallel to the swept surface, but at the same time, ensure a sufficiently rigid association between the handle and the actual broomhead or brush.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
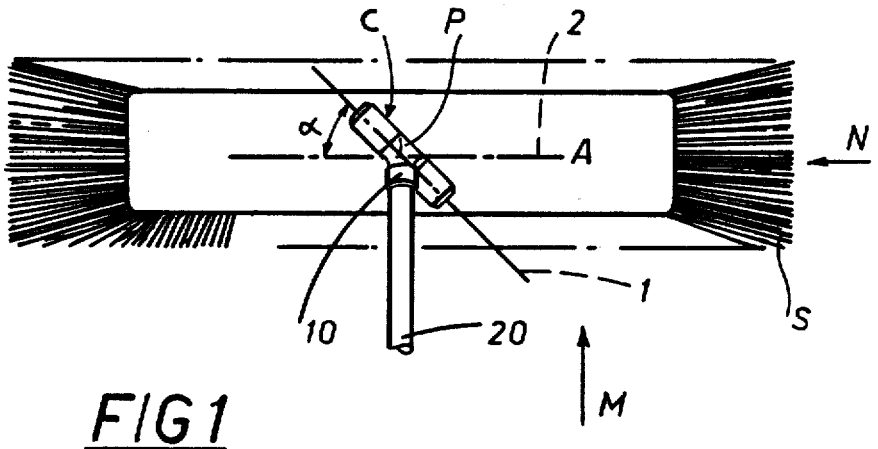
FIG. 1 is a view of the broom disclosed, from above.

With reference to the drawings, in particular to FIG. 1, the broom disclosed is of the type having a solid back A into which bristles S are planted in a plurality of tufts; C denotes a hinge fitted to the top of the back A, the axis 1 of which lies parallel to a plane containing the back A, and is set at an angle $\alpha$ in relation to the longitudinal axis denotes 2.

The hinge C is associated with a pivot P, one end of which is provided with a socket 10 to receive a handle 20; the axis of the pivot P is disposed at an angle $\beta$ in relation to the hinge axis 1, selected such that the sum of $\beta$ and $\alpha$ will be substantially equal to 90°.

In the example illustrated, the two angles $\alpha$ and $\beta$, are drawn to 45° respectively, for the sake of simplicity.

Figure 2:
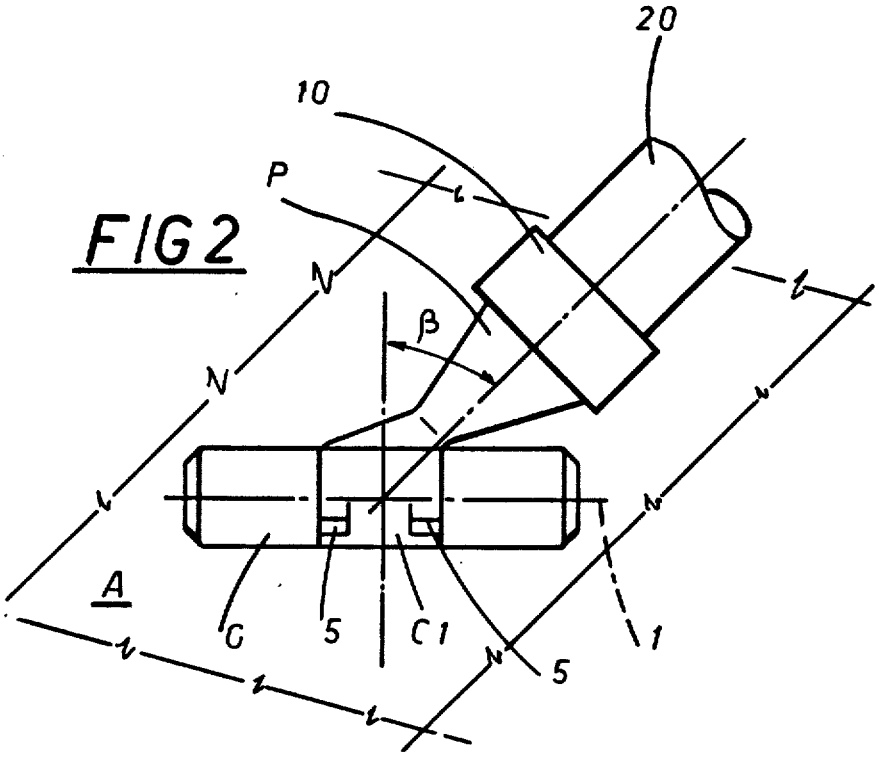
FIG. 2 is a view, likewise from above, of the hinge and pivot with which a preferred embodiment of the broom is fitted, seen with the handle positioned parallel to the back of the broomhead.
Figure 3:
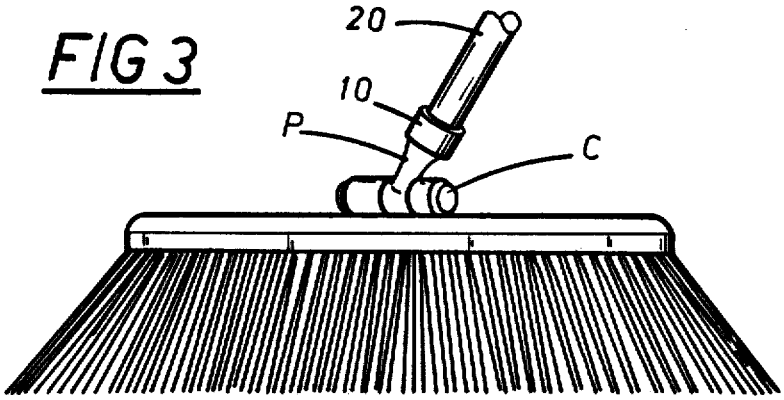
FIG. 3 is a side elevation of the broom of FIG. 1, viewed from M.

According to the invention, rotation of the handle 20 about the hinge axis 1 causes the handle 20-and-back-A assembly to assume a substantially parallel configuration (FIG. 2), which enables the user to utilize the broom even in positions that must be adopted to permit of cleaning spaces where height may be limited, e.g. beneath furniture and filing cabinets etc. Such a task is made possible in any event by virtue of having achieved a certain stability of the broomhead (see FIG. 4) in relation to the handle, ensured as a result of the geometry (i.e. relative positions and angles) of the axes of the hinge C and pivot P.

Figure 5:
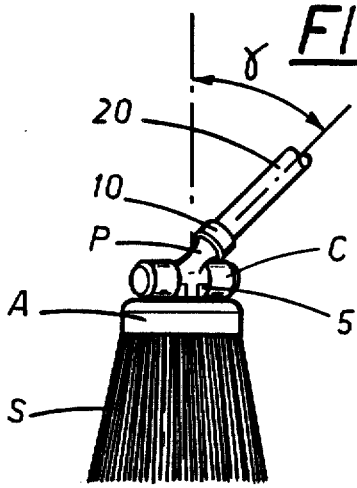
FIG. 5 is a side elevation of the broom of FIG. 2, in which the handle is viewed in the normal sweeping position.

The inhibition of tilting movement between the handle and broomhead is similarly ensured with the broom used in its upright position (see FIG. 5), in which the handle 20 is inclined away from an axis normal to the plane of the broomhead back A, at an angle such as assists sweeping; in fact, the user can lay hold on the handle in the ideal position, whilst the back of the broomhead, hence the bristles, remain faultlessly parallel with the surface being swept.

In a preferred embodiment (see FIGS. 2 and 5), the part of the pivot P that associates with the rotatable section $C_1$ of the hinge will incorporate a pair of stops 5 which, by registering against the surface of the broomhead back A, serve to establish a limit on rotation of the handle 20 that corresponds to the position adopted for general use.

More exactly, the stops 5 are embodied in such a way that the handle remains raked, from an axis normal to the plane of the back A, at an angle $\gamma$ of 45° or thereabouts (FIG. 5); accordingly, a firm, vertically-directed pressure can be exerted on the handle by the user and transferred efficiently to the entire broomhead, without any rotational movement occurring about the hinge axis 1.

It is important to observe that, whatever the position adopted when sweeping (and in particular, the limit positions illustrated), the component of the pushing and pulling force that is transmitted through the handle, and applied to the broomhead, is generated in a direction such as causes no tilting to occur.

Figure 4:
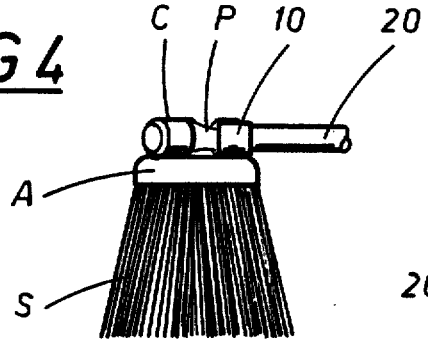
FIG. 4 is a side elevation of the broom of FIG. 1, viewed from N, in which the handle and the back of the broomhead lie in parallel planes.

In the embodiment illustrated, where $\alpha=\beta=45°$, the handle 20 can be positioned both parallel and at right angles to the axis 2 of the broomhead back A (FIGS. 2 and 4) by rotating it through 180° between the two configurations wherein broomhead and handle lie in parallel planes; needless to say, where the hinge assembly incorporates stops 5, the position of FIG. 4 will be unobtainable.

What is claimed:

1. Broom or brush with hinged handle, comprising: a back, into which bristles are set in a plurality of tufts; said back having a longitudinal axis, a hinge, said hinge having a longitudinal axis of rotation disposed at a first acute angle to the longitudinal axis of the back; a pivot, associated with and extending from the hinge and affording means for the attachment of a handle, said pivot having an axis disposed at a second acute angle to the axis of the hinge.

2. The broom or brush of claim 1 wherein the longitudinal axis of the back and the hinge longitudinal axis of rotation lie in parallel planes.

3. Broom or brush as in claim 2, wherein an angle of rake is 45°.

4. Broom or brush as in claim 2, wherein the first and second angles are complementary and together form an angle of 90°.

5. Broom or brush as in claim 2, wherein the first and second angles and are each of 45°.

* * * * *